(Model.)

A. CORDIN.
CANNON PINION FOR WATCHES.

No. 256,821. Patented Apr. 25, 1882.

Attest:
Herm. Lauten.
H. S. Abbot.

Inventor:
Antoine Cordin
By Henderson & Co,
Attorneys.

N. PETERS. Photo-Lithographer, Washington. D. C.

UNITED STATES PATENT OFFICE.

ANTOINE CORDIN, OF ELGIN, ILLINOIS.

CANNON-PINION FOR WATCHES.

SPECIFICATION forming part of Letters Patent No. 256,821, dated April 25, 1882.

Application filed December 22, 1881. (Model.)

*To all whom it may concern:*

Be it known that I, ANTOINE CORDIN, a citizen of Switzerland, residing at Elgin, in the county of Kane and State of Illinois, one of the United States of America, have invented certain new and useful Improvements in Cannon-Pinions for Watches; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figure 1:
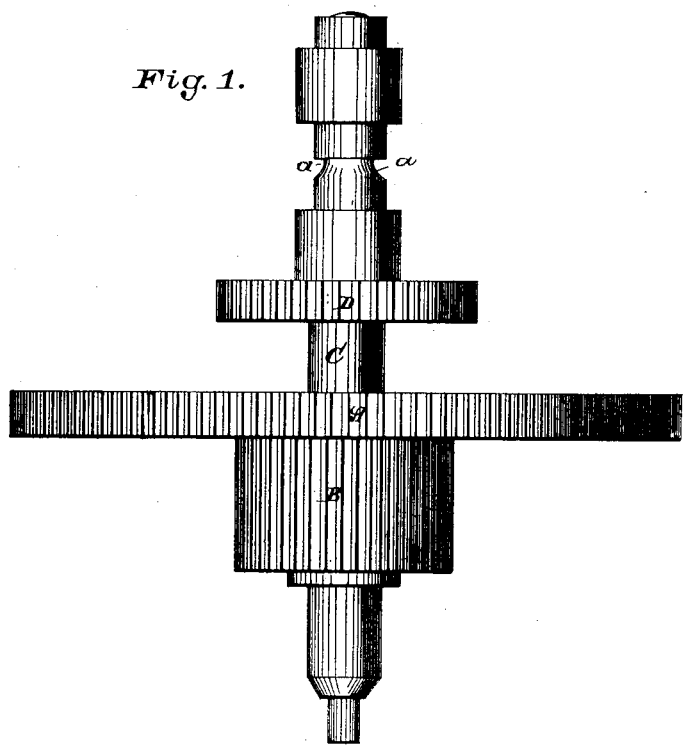
Figure 2:
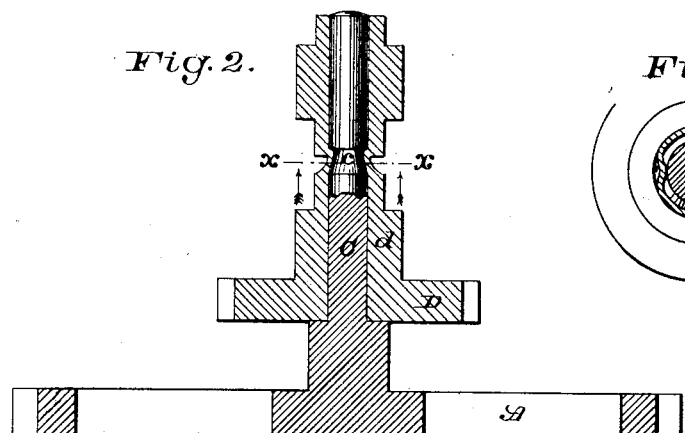
Figure 3:
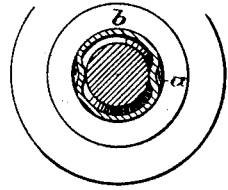

Figure 1 is a side elevation of the cannon-pinion, center-wheel, and center-pinion. Fig. 2 is a vertical section through the same, the upper portion of the arbor being whole; and Fig. 3 is a cross-section through the line $x\ x$ of Fig. 2.

My invention relates to cannon-pinions for watches, and has for its object securing the cannon-pinion to its arbor, so that the frictional contact between the pinion, or rather its cannon, and the arbor can be increased or lessened at will, whereby can be readily effected at any time the nice and accurate fitting of the pinion to the arbor requisite for the perfect working of the parts. Heretofore various methods or constructions have been devised for accomplishing the same end; but they are all susceptible of improvement, and I seek to improve upon them by the means which I will presently hereinafter particulary describe, and then seek to specifically define by the claims.

The following means have heretofore been devised, to wit: The arbor has been formed with a neck, and the cannon or tube of the pinion with a collar to fit into the neck of the cannon, and split so as to admit of being contracted or expanded by moving the hand down or up on the square shoulder of the cannon or tube. Another way has been to form a slotted opening in the cannon of the pinion in the line of its length, and then reduce the thickness of the remaining sides, and next curve them inwardly or toward the center by the aid of a former specially constructed for that purpose and passed up into the cannon. After the cannon has been thus constructed the former is removed and the pinion is ready to be placed on its arbor. Another way has been to cut away a portion of the cannon or barrel in a vertical line, so as to divide the cannon into two parts, and then transversely cut one of those parts at its lower end, so as to form a tongue, which is afterward forced or bent inwardly so as to cause it to bear against the arbor with sufficient force to cause the pinion or its cannon and arbor to be held together by the frictional contact thus effected.

The merits and demerits of the several methods or constructions enumerated will readily appear to a practical mind, and I therefore shall not attempt here to point out either.

I will now describe the means and method which I employ.

In the accompanying drawings, the letter A indicates the center-wheel; B, the center-pinion; C, the arbor or center-staff; D, the cannon-pinion, and $d$ the cannon or barrel of the pinion.

As shown by Fig. 2 of the drawings, the arbor C has a groove or tapering neck, $c$, turned thereon. The cannon of the pinion at the point $b$, that will fit about the neck of the arbor, is turned until it is thin enough to have the elasticity of a spring and to admit of being indented, as shown at $a$, by the pressure of a pair of pinchers or other suitable tool. The arbor and cannon being formed as described, the latter is slipped down over the former and the two held together by frictional contact produced by pressing in the thin portion of the cannon against the arbor until the necessary friction between the cannon and arbor to drive the hands is obtained.

If from long use the cannon comes to fit the arbor so loosely as to turn thereon, the necessary friction to restore the parts to their first accurate working or operativeness is obtained by further pressing in the indents already formed, so that there will be more surface contact between the cannon and arbor, the form of the neck on the arbor and the reduced thickness of the cannon permitting that to be easily and readily effected. If desired, additional indents may be made, so as to effect the same result.

Under my construction I am enabled to keep the cannon or barrel of the pinion in one piece, which causes it to be stronger and last longer without loosening than if it were divided. The cannon-pinion is kept to its original position and prevented from rising on the arbor, and it is of special advantage in stem-winding watches, since the friction is evenly produced and the hands prevented from turning or moving too suddenly. The construction is also very simple, and calls for the employment of no specially-constructed tools in its production.

The cannon-pinion can be easily slipped on or off its arbor, although it cannot slip or turn thereon.

It will of course be understood that the figures of the drawings are on an enlarged scale.

Having described my invention, what I claim is—

1. A cannon-pinion having its cannon or barrel reduced in thickness so as to give it the elasticity of a spring, in combination with an arbor having a groove or tapering neck, the cannon-pinion and arbor being held together by the reduced portion of the cannon being indented into the groove or neck of the arbor, substantially as set forth.

2. A cannon-pinion the barrel or cannon of which has a continuous periphery and is reduced in thickness till it has the elasticity of a spring and is adapted to be indented, as and for the purpose specified.

In testimony whereof I affix my signature in presence of two witnesses.

ANTOINE CORDIN.

Witnesses:
JEAN PIERRE CLAUDE,
MARCEL WUILLEMIN.